US006785279B1

United States Patent
Crooks (10) Patent No.: US 6,785,279 B1
(45) Date of Patent: Aug. 31, 2004

(54) CONFIGURATION IDENTIFICATION AND MAPPING IN A FRAME RELAY-ATM SERVICE INTERWORKING-BASED WIDE AREA NETWORK

(75) Inventor: Barry McKay Crooks, Maitland, FL (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/528,843

(22) Filed: Mar. 20, 2000

(51) Int. Cl.[7] .............................. H04L 12/28; H04J 3/16
(52) U.S. Cl. ..................... 370/392; 370/395.1; 370/466
(58) Field of Search ..................... 370/389, 254–255, 370/395.1, 395.3, 466, 395.52, 401, 392; 345/734, 735; 709/223–225

(56) References Cited

U.S. PATENT DOCUMENTS

| | | | | |
|---|---|---|---|---|
| 5,583,997 A | * | 12/1996 | Hart ........................... | 709/218 |
| 5,796,736 A | * | 8/1998 | Suzuki ....................... | 370/254 |
| 5,910,803 A | * | 6/1999 | Grau et al. .................. | 345/734 |
| 6,188,671 B1 | * | 2/2001 | Chase et al. ................ | 370/232 |
| 6,463,477 B1 | * | 10/2002 | Fontenot ..................... | 709/236 |

* cited by examiner

Primary Examiner—Chau Nguyen
Assistant Examiner—Nittaya Juntima (57) ABSTRACT

A destination local area network (LAN) and a local LAN are coupled by an FR-ATM Service Interworking (SIW)-based wide area network (WAN). In order to identify a connection between the destination LAN and the local LAN, an end-to-end LAN-WAN-LAN connection components template is created, which contains a number of fields which are populated during the course of identifying the connection. FR and ATM interfaces are identified on each router. The network addresses conform to Internet Protocol (IP) and are part of the same subnet. The IP address, IP subnet mask, city, state, DLCI value retrieved from the FR interface, and the VPI/VCI values retrieved from the ATM interface are stored to create a list describing the physical and logical characteristics of the FR and ATM interfaces. A pair of network addresses is identified using the IP address in conjunction with the subnet mask stored on either the FR or ATM interface in the list. The DLCI value associated with each of the network IP addresses is identified. The VPI/VCI values associated with each of the network IP addresses are identified. WAN configuration data are retrieved and prepared so as to permit LAN-to-WAN correlation. The city, state, DLCI value of the FR interface, and VCI/VPI value of the ATM interface on the LANs are associated with the city, state, DLCI value, and VCI/VPI values on the WAN. The associated configuration information and components of the WAN are retrieved and stored alongside entries in the list.

18 Claims, 4 Drawing Sheets

| SOURCE CPE ROUTER |
|---|
| CONFIGURATION: |
| IP 192.168.96.210 |
| INTF S111 |
| DLCI 551 |

FIG. 3
119

| DESTINATION CPE SWITCH ROUTER |
|---|
| CONFIGURATION: |
| IP 192.168.96.209 |
| INTF ATM 1/3.3 |
| VPI/VCI 1/158 |

CONFIGURATION IDENTIFICATION AND MAPPING IN A FRAME RELAY-ATM SERVICE INTERWORKING-BASED WIDE AREA NETWORK

RELATED APPLICATIONS

This application is related to the U.S. application entitled "CONFIGURATION MAPPING IN AN ATM-BASED WIDE AREA NETWORK" Ser. No. 09/531,977 filed Mar. 20, 2000 and is assigned to the owner of that application.

FIELD OF THE INVENTION

The present invention relates to a network configuration identification and mapping method and apparatus in a network having multiple local-area networks (LANs) connected using a Frame Relay-ATM Service Interworking (SIW)-based wide-area network (WAN).

BACKGROUND OF THE INVENTION

Frame Relay-ATM Service Interworking (SIW), as defined by the FR Forum and ATM Forum, relies on protocol conversion that permits a frame relay device to communicate with an ATM device. In essence, it allows an ATM end station to communicate with a frame relay ("FR") end station without either side having knowledge about the protocol being used on the other end. Service Interworking couples a FR WAN to an ATM WAN, producing what is termed a FR-ATM SIW based-WAN, which can be considered a hybrid WAN.

The success of the modem business enterprise depends heavily on the computing and communications infrastructure that supports it. This infrastructure is considered a strategic asset by businesses, and has changed dramatically over the years as a result of the evolution in data processing and telecommunications. Because of recent advances in computing and telecommunications, companies are rapidly adopting new ways of doing business, with the end result that mission critical applications and operations have moved onto the network and are increasingly dependent on new networking paradigms.

These new applications generally have some fundamental differences from earlier data applications. First, they demand much higher bandwidth because the amount of traffic generated by them is so much greater. Second, there is a greater need for network connectivity among a much larger end-user population. Where; in the past, the network simply connected internal, specialized functional areas, the modern network interconnects virtually everyone within the corporate structure. Traditional methods of connecting occasional users to the network involve the use of dial-up lines of relatively low speed, which are not satisfactory for meeting today's connectivity requirements.

Another characteristic of the modern business is that it often comprises multiple geographically dispersed locations. In addition, many firms permit or even encourage telecommuting. Combining of Frame Relay ("FR") and ATM technologies as in Frame Relay-ATM Service Interworking permits the use of the cost effective FR technology at the remote premise sites while permitting economies and versatility of ATM protocol in the backbone network, and at the local server end. Additionally, use of ATM will permit the bundling of services which require very high bandwidth and quality reliability with traditional telephony and data traffic. Using FR and ATM makes it possible for such far-flung enterprises to exchange information rapidly and effectively. One example of the use of FR-ATM Service Interworking technology is as part of a wide-area network (WAN) that is used to interconnect and seamlessly integrate multiple remote local area networks (LANs) to form an enterprise intranet. One advantage of this scheme is that the FR-ATM SIW-based WAN is transparent, and the distributed LANs function as a single LAN from the perspective of the end-user. There is, however, a significant disadvantage to this scheme. Because the FR-ATM SIW-based WAN is transparent, the managers of the LANs cannot diagnose faults within the WAN. Therefore, a LAN manager cannot determine whether a network fault lies within the LAN or within the WAN. Additionally, WAN reported faults cannot be correlated to the associated LAN components. This need becomes even more important in environments such as the FR-ATM Service Interworking based WAN, which combines two WANs in the pathway between distant LANs.

SUMMARY OF THE INVENTION

According to an illustrative embodiment of the invention, a destination local area network (LAN) and a local LAN are coupled by a combined Frame Relay ("FR") and ATM-based wide area network (WAN). Each LAN includes a router. The ATM WAN includes an ATM switch having a customer switch port and the FR WAN includes a FR switch having a customer switch port. One or more ATM interfaces are configured on the router connected to the ATM switch. One or more FR interfaces are configured on the router connected to the FR switch. The ATM interface on the router of the local LAN and the FR interface on the router of the destination LAN form an interface end-point pair. In order to identify a connection between the destination LAN and the local LAN, an end-to-end LAN-WAN-LAN connection components template is created. The template contains a number of fields, which are populated during the process of identifying the end-point to end-point connection.

ATM and FR interfaces are identified on routers on the intranet. The network addresses of an interface end-point pair conform to Internet Protocol (IP) and are part of the same subnet. This type of configuration is termed a point-to-point connection. The IP address, IP subnet mask, city, state, the VPI/VCI ("virtual circuit identifier") value from the ATM interface, and the DLCI ("data link connection identifier") value from the FR interface are retrieved from the ATM and FR router interfaces. These values are stored to create a list describing the physical and logical characteristics of the ATM and FR interfaces. A pair of network addresses is identified using the IP address in conjunction with the subnet mask stored on either the ATM interface or the FR interface in the list. The virtual circuit identifier value on the ATM interface and data link connection identifier value on the FR interface that are associated with each of the network IP addresses are identified. WAN configuration data are retrieved and prepared so as to permit LAN-to-WAN correlation. Preparation involves the capitalization of all characters in the city and state names in the list of ATM and FR interfaces, and the manipulation by algorithm of the characters forming the city name, which limits its final length and which excludes specific character types such as vowels from the resultant string. The city, state, data link connection identifier value, and virtual circuit identifier values of the interfaces on the LANs are associated with the city, state, data link connection identifier value, and pair of virtual circuit identifier values on the combined WANs. The associated configuration information and components of the WAN are retrieved and stored alongside entries in the list of ATM and FR interfaces.

Further features and advantages of the present invention, as well as the structure and operation of various embodiments of the present invention are described in detail below with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

The preferred embodiment is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention.

Figure 1:
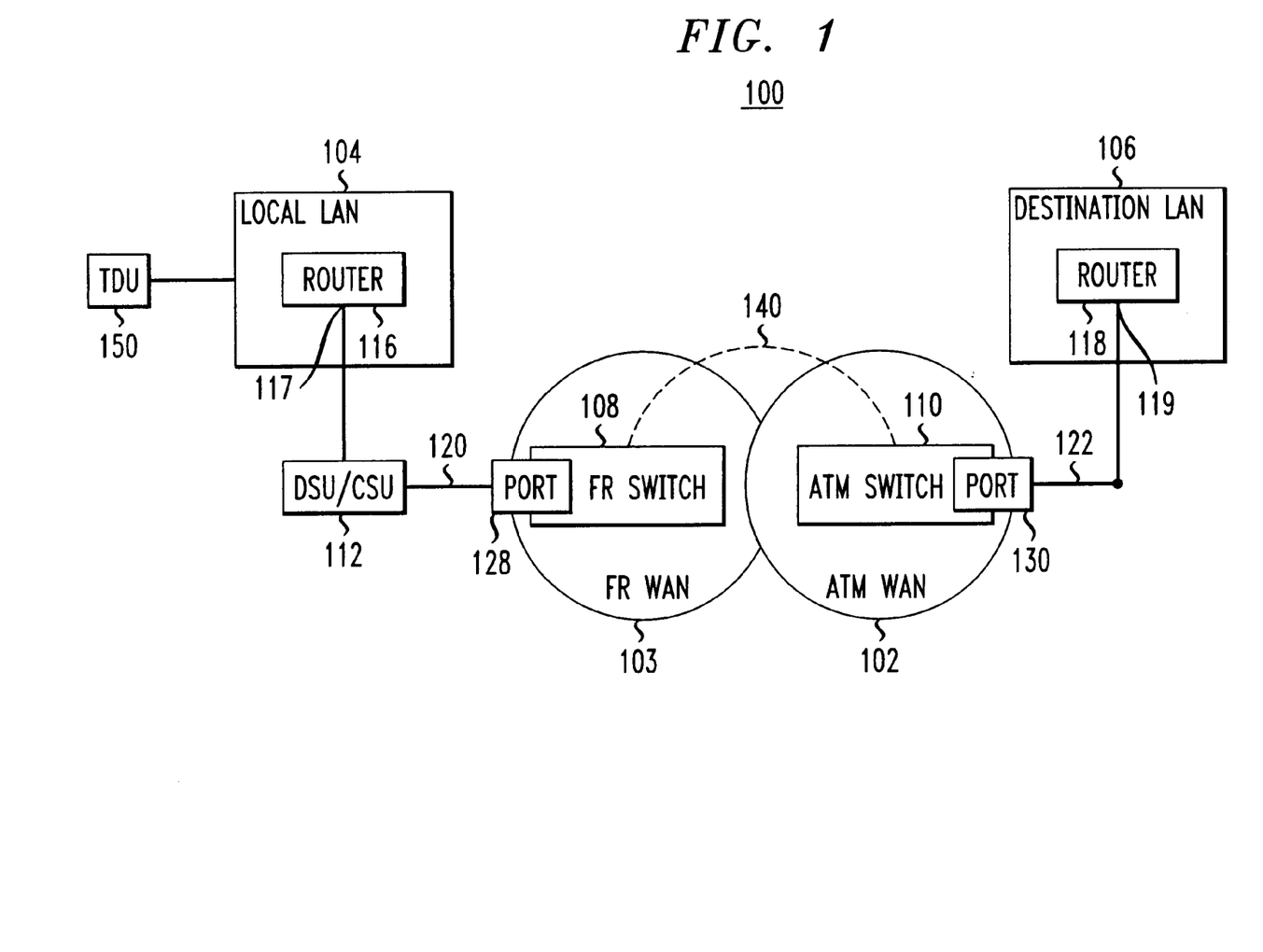
FIG. 1 illustrates an FR-ATM Service Interworking-based communications network.

FIG. 1 depicts a frame relay ("FR")-ATM Service Interworking (SIW)-based communications network 100. Network 100 includes two local-area networks (LANs), referred to as local LAN 104 and destination LAN 106, which are coupled by an ATM wide-area network (WAN) 102 and a FR wide area network (WAN) 103, which together form a FR-ATM SIW-based WAN. Local LAN 104 includes a router 116 (e.g., a router manufactured by Bay Networks). The router 116 is coupled at FR interface 117 to port 128 on an FR switch 108 within WAN 103 via an access circuit 120 that includes a DSU-to-CSU converter ("DSU/CSU") 112. Destination LAN 106 includes a router 118 (e.g., a switch router manufactured by Cisco). The router 118 is coupled at ATM interface 119 to port 130 on an ATM switch 110 within WAN 102 by an access circuit 122 without a DSU/CSU. ATM WAN 102 is directly or indirectly connected to FR WAN 103 by circuit 140.

A digital service unit (DSU) is a device used in digital transmission for connecting a channel service unit (CSU) to data terminal equipment (a terminal or computer), as is also well known in the relevant arts. A DSU provides a standard interface to a user's terminal which is compatible with modems and handles such functions as signal translation, regeneration, reformatting, and timing. The transmitting portion of the DSU processes the customer's signal into bipolar pulses suitable for transmission over the digital facility. The receiving portion of the DSU is used both to extract timing information and to regenerate mark and space information from the received bipolar signal.

A channel service unit (CSU) is a type of interface device used to connect a terminal or computer to a digital medium, as is well known in the relevant arts. A CSU is provided by the communication carrier to customers who wish to use their own equipment to retime and regenerate the incoming signals. The customer must supply all of the transmit logic, receive logic, and timing recovery in order to use the CSU.

A router can either have ATM interfaces or frame relay (FR) interfaces, or a combination of them. FR interface 117 on router 116 within local LAN 104 is connected by DSU/CSU 112 to the FR switch 108, which includes a customer switch port 128. Interface 119 on router 118 within destination LAN 106 is connected to ATM switch 110. ATM switch 110 includes a customer switch port 130. DSU/CSU 112 is coupled to FR switch 108 by access circuit 120 at customer switch port 128. Destination LAN 106 is coupled to ATM switch 110 at customer switch port 130 by access circuit 122. FR interface 117 on router 116 of the local LAN 104 and ATM interface 119 on router 118 of the destination LAN 106 in the communications network 100 depicted in FIG. 1 are schematically illustrated as templates containing information in FIGS. 2 and 3, respectively.

Figure 2:
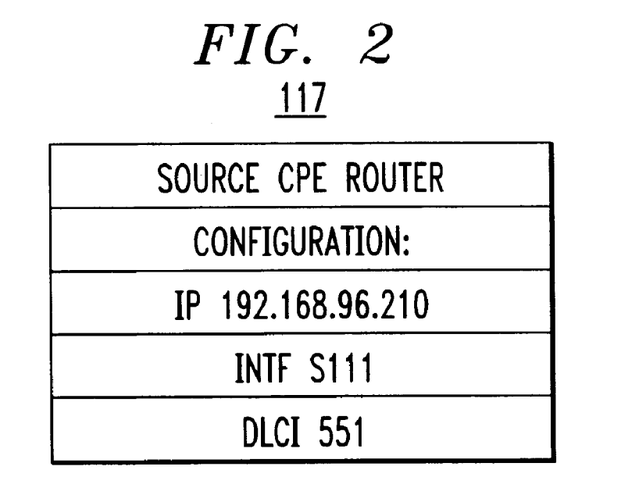
FIGS. 2 and 3 schematically illustrate an ATM interface of a local LAN and a FR interface of a destination LAN in the communications network depicted in FIG. 1.
Figure 3:
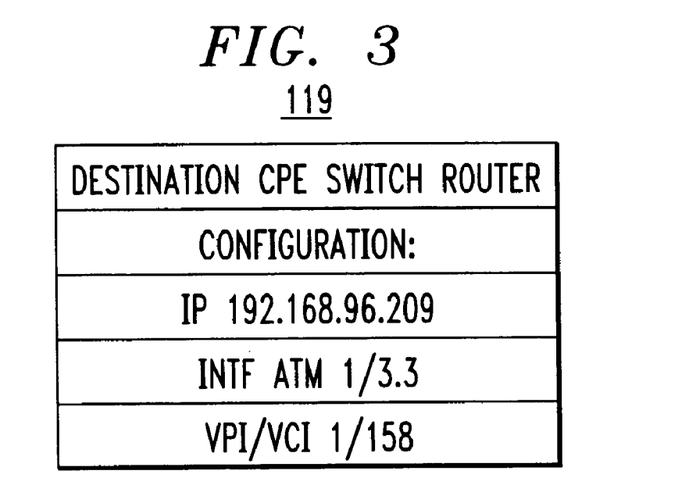

A data link connection identifier ("DLCI") value is associated with FR interface 117 on the router of the local LAN 104, as shown in FIG. 2. A data link connection identifier value is a logical value in a ten-bit field in the frame header that gives the (frame switch) port-specific address of the remote(destination) end of the PVC connection. Each DLCI value specifies a connection from one port to another in the network. A virtual circuit identifier ("VPI/VCI") value is associated with the ATM interface 119 on the router of the destination LAN 106, as shown in FIG. 3. A virtual circuit identifier value is a logical ID that defines a path of a data packet from an ATM interface on a router to a customer switch port on an ATM switch.

ATM switch 110 within the ATM WAN 102 may be connected directly or indirectly to FR switch 108 within the FR WAN 103 via zero, one or more switches. For ease of discussion, FR switch 108 and ATM switch 110 are shown directly connected by circuit 140.

In general, each LAN maintains configuration information for its components. This configuration information is generally stored, either on the components themselves, or on a network management system (NMS) within or attached to the LAN. When a fault occurs within a LAN, that LAN's configuration information is generally used to diagnose and correct the fault.

Compound networks such as network 100 are designed so that the WAN components are completely transparent to the LANs. The objective is to make it appear that the local and destination LANs are directly connected. One common application of this technique is to create an intranet for a company by connecting multiple LANs that are distant from one another. In the specific embodiment illustrated in FIG. 1, the FR interface 117 on local LAN 104 and the ATM interface 119 on destination LAN 106 are part of the same intranet and same IP subnet.

One disadvantage of the conventional LAN-WAN-LAN arrangement is that problems occurring within the WAN cannot be diagnosed by the managers of the LANs because configuration information in the WAN is not available to them. WAN configuration information is generally stored either within the WAN components, or within network management systems (NMSs) within or attached to the WAN. The present invention addresses this problem by collecting network component information from both LAN and WAN sources and combining this information to produce an end-to-end LAN-WAN-LAN topology of the network.

The WAN connection between access circuit 120 and access circuit 122 is often referred to as a permanent virtual circuit (PVC). A PVC within a FR-ATM SIW network is identified by a set of FR and ATM customer switch ports, and by a set of VPI/VCI and DLCI values. For example, the PVC connecting the local LAN 104 and the local LAN 106 is identified by the destination FR customer switch port 128, a destination DLCI value for FR interface 117 on router 116, a local ATM customer switch port 130, and a local VPI/VCI value for the ATM interface 119 on router 118. Other configuration information is available to completely define the WAN components, the FR switch 108, and the ATM switch 110.

Figure 4:
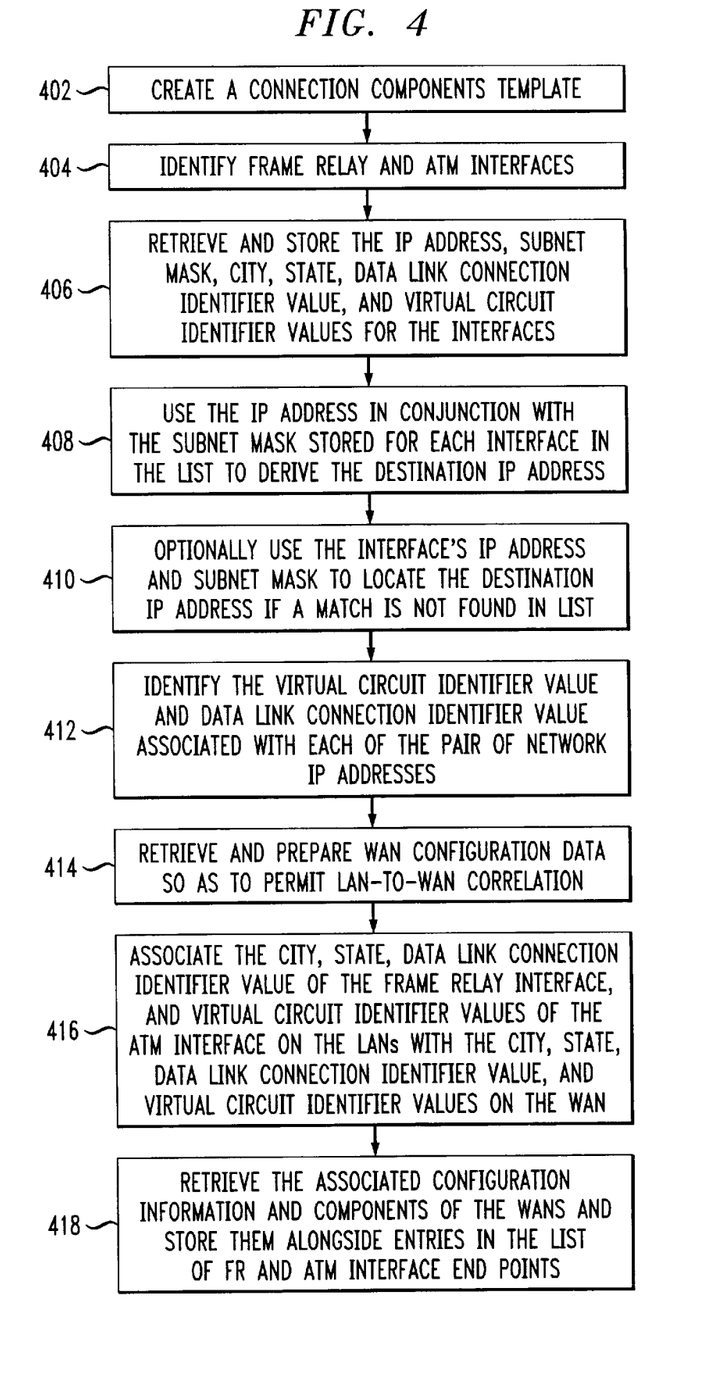
FIG. 4 is a flow chart depicting the topology discovery process of the present invention according to a preferred embodiment.

FIG. 4 is a flow chart depicting the topology discovery process of the present invention according to a specific embodiment. In the specific embodiment, this process is executed by topography discovery unit (TDU) 150, which is attached to local LAN 104. An example of the structure of TDU 150 is discussed in detail below.

In step 402, TDU 150 creates a connection components template. The connection components template is an array list. That is, each entry on the list is itself an array. Stored at each entry of the array list are the data that characterize the physical devices and configuration components needed to map an end-to-end topology for an FR-ATM SIW-based LAN-WAN-LAN network. An exemplary connection components template is presented in TABLE I. Certain fields of the template are needed to aid in network address derivation and in matching the LAN data to WAN data components configured on FR and ATM switches.

The template presented in TABLE I is the repository of information that is gathered and identified in the course of the topology discovery process. The template stores the information that is identified in the end-to-end topology from the local side of the FR-ATM SIW-based WAN to the destination side.

TABLE 1

| | |
|---|---|
| 1. | Destination router (hostname) |
| 2. | Destination router interface IP address |
| 3. | Destination router interface IP Sub Net Mask |
| 4. | Destination router Interface Description |
| 5. | Destination router interface protocol |
| 6. | Destination router city and state |
| 7. | Destination router ATM (VPI/VCI) |
| 8. | ATM switch destination Access Circuit |
| 9. | ATM switch destination (customer) port |
| 10. | ATM switch destination port city and state |
| 11. | ATM switch Destination ATM (VPI/VCI) |
| 12. | FR Local DLCI |
| 13. | FR switch local (customer) port |
| 14. | FR switch local (customer) port city and state |
| 15. | FR local Access Circuit |
| 16. | Local router (hostname) |
| 17. | Local router interface description |
| 18. | Local router interface IP address |
| 20. | Local interface protocol |
| 21. | Local router interface IP address |
| 23. | Local router city and state |
| 25. | Local router FR DLCI |

In step 404, TDU 150 identifies all the frame relay ("FR") and ATM interfaces on the routers in the intranet. The FR and ATM interfaces at each router are the end points of the end-to-end topology of the network. The database of a discovery network management system (NMS), router configurations, or direct access to MIB (management information base) objects on routers can be used to perform this identification. An example of a network management system (NMS) is Hewlett Packard's Network Node Manager & Open View products. Because not all routers may be present in the NMS database, router configuration files are used to augment this list. This ensures that routers not previously discovered by the NMS are included in the topology discovery process.

In step 406, TDU 150 examines each of the FR and ATM interfaces and retrieves and stores the IP address, the subnet mask, the city, the state, the data link connection identifier value of the FR interface, and the virtual circuit identifier values of the ATM interface, thereby creating a list of physical and logical information representing the FR or ATM interface end points.

In step 408, TDU 150 uses the IP address in conjunction with the subnet mask stored on both the FR and ATM interfaces in the list to derive the destination IP address. TDU 150 identifies in the list the two IP addresses that are part of the same IP subnet, thereby identifying the end-point interface pair of network IP addresses. For interface end-points to be members of an end-point interface pair, the network address at each FR and ATM interface must belong to the same IP subnet (i.e., the same intranet). Each entry on the list is augmented with corresponding values from the associated FR or ATM interface end-point.

Optionally, TDU 150 uses a separate auxiliary process to derive the destination IP addresses if they are not found on the list. In step 410, this auxiliary process uses the interface's IP address and subnet mask to locate the destination IP address. This is done by pinging each of the potential addresses. A router IP address that responds to the ping is the destination IP address.

Some component manufacturers may not fully implement use of the standard management information base (MIB) for representing network configuration. Instead manufacturers such as Bay Networks use a non-standard information base, referred to as a "private MIB." Because information in private MIBs does not conform to a MIB standard, FR or ATM interface information for these devices is not accurately represented in the NMS database. For these devices, FR and ATM interface information is obtained by accessing the MIB objects resident on the device. Configuration data for routers manufactured by Bay Networks can also be obtained from an ASCII data extract of the configuration or by router commands. In FIGS. 2 and 3, the FR and ATM interfaces, respectively, are represented schematically as templates containing information characterizing the physical and logical aspects of operation of the routers to direct and redirect data packets.

In step 412, TDU 150 identifies the virtual circuit identifier value and data link connection identifier value associated with each of the pair of network IP addresses.

In step 414, TDU 150 retrieves and prepares WAN configuration data so as to permit LAN-to-WAN correlation. Specifically, the city and state are reformatted so that their values are stored in a manner that will permit comparison of a LAN city to a WAN city and a LAN state to a WAN state. The characters forming the state and city names in the list are all capitalized. The city names are further manipulated by algorithm to create a character string which limits the length of the name and which excludes certain characteristics from the name such as vowels.

In step 416, TDU 150 associates the city, state, data link connection identifier value of the FR interface, and the virtual circuit identifier values of the ATM interface on the LANs with the city, state, data link connection identifier value, and virtual circuit identifier values on the FR-ATM SIW-based WAN. Use of the city and state values are used only when the virtual circuit identifier values alone are not sufficient to ascertain the correct LAN to WAN association.

In step 418, TDU 150 retrieves the associated configuration information and components on the WAN and stores them alongside entries in the list that correspond to the FR and ATM interface end-points set. That is, the fields of the connection components template presented in TABLE I are populated. The resultant TABLE I contains a list of data entries, where the data entries indicate the physical and logical components of a LAN-WAN-LAN circuit.

Figure 5:
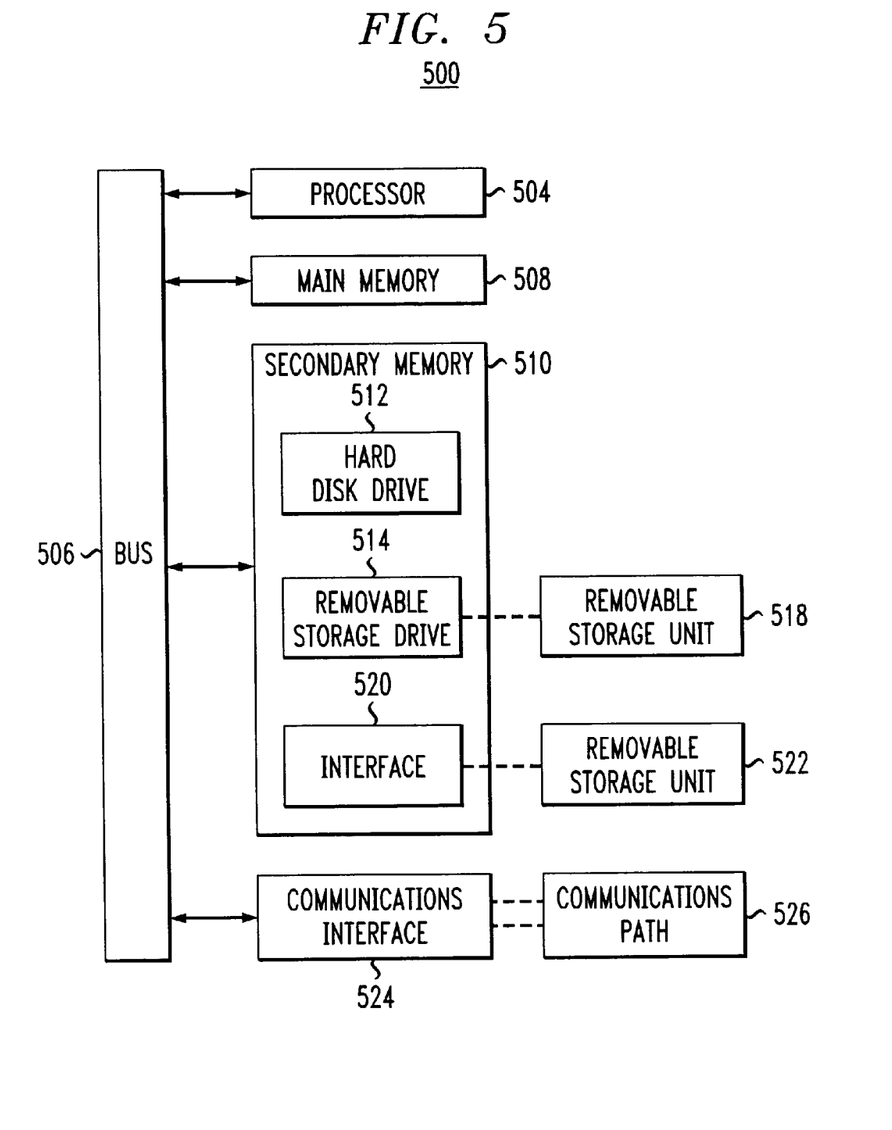
FIG. 5 is a block diagram of an example computer system for implementing the present invention.

TDU 150 of the present invention may be implemented using hardware, software or a combination thereof and may be implemented in a computer system or other processing system. In an illustrative embodiment, the invention is directed toward one or more computer systems capable of carrying out the functionality described herein. An example computer system 500 is shown in FIG. 5. The computer system 500 includes one or more processors, such as processor 504. The processor 504 is connected to a communication bus 506. Various software embodiments are described in terms of this example computer system. After reading this description, it will become apparent to a person skilled in the relevant art how to implement the invention using other computer systems and/or computer architectures.

Computer system 500 also includes a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518 represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other similar means for allowing computer programs or other instructions to be loaded into computer system 500. Such means can include, for example, a removable storage unit 522 and an interface 520. Examples of such include a program cartridge and cartridge interface (such as that found in video game devices), a removable memory chip (such as an EPROM, or PROM) and associated socket, and other removable storage units 522 and interfaces 520 which allow software and data to be transferred from the removable storage units to computer system 500.

Computer system 500 can also include a communications interface 524. Communications interface 524 allows software and data to be transferred between computer system 500 and external devices. Examples of communications interface 524 can include a modem, a network interface (such as an Ethernet card), a communications port, a PCM-CIA slot and card, etc. Software and data transferred via communications interface 524 are in the form of signals which can be electronic, electromagnetic, optical or other signals capable of being received by communications interface 524. These signals are provided to communications interface 524 via a communications path 526. This communications path 526 carries signals and can be implemented using wire or cable, fiber optics, a phone line, a cellular phone link, an RF link and other communications channels.

In this document, the terms "computer program medium" and "computer usable medium" are used to generally refer to media such as removable storage device 518, a hard disk installed in hard disk drive 512, and communications path 526. These computer program products are means for providing software to computer system 500.

Computer programs (also called computer control logic) are stored in main memory 508 and/or secondary memory 510. Computer programs can also be received via communications interface 524. Such computer programs, when executed, enable the computer system 500 to perform the features of the present invention as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

While various embodiments of the present invention have been described above, it should be understood that they have been presented by way of example, and not limitation. It will be apparent to persons skilled in the relevant arts that various changes in form and detail can be made without departing from the spirit and scope of the present invention. Thus the present invention should not be limited by any of the above-described exemplary embodiments, but should be defined only in accordance with the following claims and their equivalents.

What is claimed is:

1. A method for identifying a connection between a destination local area network (LAN) and a local LAN where said LANs are coupled by a Frame Relay (FR)-ATM Service Interworking (SIW)-based wide area network (WAN), wherein each of said LANs includes a router, and wherein said WAN includes an FR switch and an ATM switch, the method comprising the steps of:

identifying one or more FR or ATM interfaces on each router;

retrieving and storing an IP address, a subnet mask, a city, a state, a data link connection identifier value for each FR interface, and a virtual circuit identifier value for each ATM interface, thereby identifying a list of entries;

using the IP address in conjunction with the subnet mask stored on both the FR and ATM interfaces in the list to derive a destination IP address, thereby identifying a pair of network IP addresses;

identifying a data link connection identifier value and a virtual circuit identifier value associated with the pair of network IP addresses;

retrieving and preparing WAN configuration data by manipulating the characters and length of the city and state names so as to permit a LAN-to-WAN correlation;

associating the city, state, data link connection identifier value of the FR interface, and the virtual circuit identifier values of the ATM interface on the LANs with the city, state, data link connection identifier value, and virtual circuit identifier values on the WAN; and retrieving and storing the associated configuration information and components of the WAN along with the entries of the list.

2. The method of claim 1, wherein identifying one or more FR or ATM interfaces on each router comprises the step of:

querying LAN management information including at least one of a network management system database, router command, router configuration files, and router management information base objects.

3. The method of claim 1, wherein retrieving and storing an IP address, a subnet mask, a city, a state, a data link connection identifier value for each FR interface, and a virtual circuit identifier value for each ATM interface comprises the step of:

querying LAN management information including at least one of a network management system database, router command, router configuration files, and router management information base objects.

4. The method of claim 1, further comprising the step of:

creating a connection components template.

5. The method of claim 1, wherein:

said pair of network IP addresses are part of the same subnet.

6. The method of claim 5, wherein using the IP address in conjunction with the subnet mask stored on both the FR and ATM interfaces in the list to derive a destination IP address comprises the step of:

matching pairs of IP addresses using the subnet value.

7. A computer program product for identifying a connection between a destination local area network (LAN) and a local LAN where said LANs are coupled by a Frame Relay (FR)-ATM Service Interworking (SIW)-based wide area network (WAN), wherein each of said LANs includes a router, and wherein said WAN includes an FR switch and an ATM switch, said computer program product comprising:

a computer usable medium having computer readable program code means embodied in said medium, said computer readable program code means comprising:

a computer readable first program code means for causing a computer to identify one or more FR or ATM interfaces on each router;

a computer readable second program code means for causing a computer to retrieve and store an IP address, a subnet mask, a city, a state, a data link connection identifier value for each FR interface, and a virtual circuit identifier value for each ATM interface, thereby identifying a list of entries;

a computer readable third program code means for causing a computer to use the IP address in conjunction with the subnet mask stored on both the FR and ATM interfaces in the list to derive a destination IP address, thereby identifying a pair of network IP addresses;

a computer readable fourth program code means for causing a computer to identify a data link connection identifier value and a virtual circuit identifier value associated with the pair of network IP addresses;

a computer readable fifth program code means for causing a computer to retrieve and prepare WAN configuration data by manipulating the characters and length of the city and state names so as to permit a LAN-to-WAN correlation;

a computer readable sixth program code means for causing a computer to associate the city, state, data link connection identifier value of the FR interface, and virtual circuit identifier value of the ATM interface on the LANs with the city, state, data link connection identifier value, and virtual circuit identifier values on the WAN; and a computer readable seventh program code means for causing a computer to retrieve and store the associated configuration information and components of the WAN along with the entries of the list.

8. The computer program product of claim 7, wherein said computer readable first program code means comprises:

a computer readable program code means for causing a computer to query LAN management information including at least one of a network management system database, router command, router configuration files, and router management information base objects.

9. The computer program product of claim 7, wherein said computer readable second program code means comprises:

a computer readable program code means for causing a computer to query LAN management information including at least one of a network management system database, router command, router configuration files, and router management information base objects.

10. The computer program product of claim 7, wherein said computer readable program code means further comprises:

a computer readable eighth program code means for causing a computer to create a connection components template.

11. The computer program product of claim 7, wherein:

said pair of network IP addresses are part of the same subnet.

12. The computer program product of claim 11, wherein said computer readable third program code means comprises:

a computer readable program code means for causing a computer to match pairs of IP addresses using their subnet addresses.

13. An apparatus for identifying a connection between a destination local area network (LAN) and a local LAN where said LANs are coupled by a Frame Relay (FR)-ATM Service Interworking (SIW) based wide area network (WAN), wherein each of said LANs includes a router, and wherein said WAN includes an FR switch and an ATM switch, the apparatus comprising:

means for identifying one or more FR or ATM interfaces on each router;

means for retrieving and storing an IP address, a subnet mask, a city, a state, a data link connection identifier value for each FR interface, and a virtual circuit identifier value for each ATM interface, thereby identifying a list of entries;

means for using the IP address in conjunction with the subnet mask stored on both the FR and ATM interface in the list to derive a destination IP address, thereby identifying a pair of network IP addresses;

means for identifying a data link connection identifier value and a virtual circuit identifier value associated with the pair of network IP addresses;

means for retrieving and preparing WAN configuration data by manipulating the characters and length of the city and state names so as to permit a LAN-to-WAN correlation;

means for associating the city, state, data link connection identifier value on the FR interface, and virtual circuit identifier values of the ATM interfaces on the LANs with the city, state, data link connection identifier value, and virtual circuit identifier values on the WAN; and means for retrieving and storing the associated configuration information and components of the WAN along with the entries of the list.

14. The apparatus of claim 13, wherein said means for identifying one or more FR or ATM interfaces on each router comprises:

means for querying LAN management information including at least one of a network management system database, router command, router configuration files, and router management information base objects.

15. The apparatus of claim 13, wherein said means for retrieving and storing an IP address, a subnet mask, a city, a state, a data link connection identifier value for each FR interface, and a virtual circuit identifier value for each ATM interface comprises:

means for querying LAN management information including at least one of a network management system database, router command, router configuration files, and router management information base objects.

16. The apparatus of claim 13, further comprising:

means for creating a connection components template.

17. The apparatus of claim 13, wherein:

said pair of network IP addresses are part of the same subnet.

18. The apparatus of claim 17, wherein said means for using the IP address in conjunction with the subnet mask stored on both the FR and ATM interfaces in the list to derive a destination IP address comprises:

means for matching pairs of IP addresses using their subnet addresses.

* * * * *